(12) United States Patent
Eivy et al.

(10) Patent No.: US 12,260,384 B2
(45) Date of Patent: Mar. 25, 2025

(54) ENABLING DEEP HISTORICAL DATA USE VIA NFT RE-MINTING

(71) Applicant: Disney Enterprises, Inc., Burbank, CA (US)

(72) Inventors: Adam D. Eivy, Vashon, WA (US); Dionysius Mavromatis, Kirkland, WA (US); Charles V. Pritchard, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 133 days.

(21) Appl. No.: 17/959,227

(22) Filed: Oct. 3, 2022

(65) Prior Publication Data

US 2023/0106344 A1 Apr. 6, 2023

Related U.S. Application Data

(60) Provisional application No. 63/251,984, filed on Oct. 4, 2021.

(51) Int. Cl.
*G06Q 20/12* (2012.01)

(52) U.S. Cl.
CPC ................. *G06Q 20/1235* (2013.01)

(58) Field of Classification Search
CPC .................................................. G06Q 20/1235
See application file for complete search history.

(56) References Cited

U.S. PATENT DOCUMENTS

| | | | |
|---|---|---|---|
| 6,173,291 B1 * | 1/2001 | Jenevein | G06F 16/10 |
| 9,356,971 B1 * | 5/2016 | McClintock | H04L 63/0853 |
| 11,301,460 B2 | 4/2022 | Rich et al. | |
| 11,348,099 B2 * | 5/2022 | Vijayan | G06Q 20/325 |
| 11,770,366 B2 * | 9/2023 | Rodriguez | H04L 67/306 |
| 2017/0052676 A1 * | 2/2017 | Pulier | G06F 3/04883 |
| 2017/0076293 A1 * | 3/2017 | Cage | G06Q 20/3223 |
| 2018/0049028 A1 * | 2/2018 | Tali | H04W 4/80 |
| 2018/0248699 A1 * | 8/2018 | Andrade | H04L 63/0861 |
| 2018/0276632 A1 * | 9/2018 | Gandevia | G06Q 30/08 |

(Continued)

OTHER PUBLICATIONS

Blockchain based Music Streaming Platform using NFTs, 2023 (Year: 2023).*

(Continued)

*Primary Examiner* — Bruce I Ebersman
(74) *Attorney, Agent, or Firm* — Farjami & Farjami LLP

(57) ABSTRACT

According to one exemplary implementation, a system includes a hardware processor and a system memory storing software code, the hardware processor is configured to execute the software code to provide a non-fungible token (NFT) for transfer of a right to the NFT, the NFT minted to include first metadata providing a historical rights record of the NFT, the historical rights record identifying a present owner of the right to the NFT. The hardware processor is further configured to execute the software code to receive transfer data relating to the transfer of the right to the NFT by the present owner to a new owner of the right to the NFT, re-mint the NFT to further include second metadata relating to the transfer data in the historical rights record, the second metadata identifying the new owner, and deliver the re-minted NFT, including the first and second metadata, to the new owner.

17 Claims, 8 Drawing Sheets

(56) References Cited

U.S. PATENT DOCUMENTS

| | | | | |
|---|---|---|---|---|
| 2018/0285951 | A1* | 10/2018 | Borovikov | G06Q 20/223 |
| 2020/0242105 | A1* | 7/2020 | Rich | H04L 9/40 |
| 2021/0248214 | A1* | 8/2021 | Goldston | G06F 21/16 |
| 2021/0279305 | A1* | 9/2021 | Goldston | G06F 16/41 |
| 2021/0279695 | A1* | 9/2021 | Rice | G06Q 20/12 |
| 2021/0281410 | A1* | 9/2021 | Hain | H04N 21/254 |
| 2021/0357489 | A1* | 11/2021 | Tali | H04L 9/3228 |
| 2022/0006642 | A1* | 1/2022 | Maj | H04L 9/3213 |
| 2022/0092599 | A1* | 3/2022 | Sofaer | G06Q 20/0655 |
| 2022/0222364 | A1* | 7/2022 | Roberts | G06F 21/64 |
| 2023/0006976 | A1* | 1/2023 | Jakobsson | H04L 9/50 |
| 2023/0009908 | A1* | 1/2023 | Castinado | H04L 9/0819 |
| 2023/0017499 | A1* | 1/2023 | Agrawal | H04L 9/3236 |
| 2023/0073859 | A1* | 3/2023 | Matthews | G06Q 30/0641 |
| 2023/0086644 | A1* | 3/2023 | Jakobsson | G06Q 20/367 705/65 |
| 2023/0106344 | A1* | 4/2023 | Eivy | G06Q 20/1235 705/39 |
| 2023/0108983 | A1* | 4/2023 | Vosseller | G06Q 20/38215 705/76 |
| 2023/0342767 | A1* | 10/2023 | Andon | H04L 63/10 |

OTHER PUBLICATIONS

Decentralized Music Platform: A Blockchain-based Solution for NFT Music Distribution and Royalty Management IEEE 2024 (Year: 2024).*

NFTs: Applications and Challenges IEEE 2021 (Year: 2021).*

"Demystifying Non-Fungible Tokens (NFTs)" A Thematic Report prepared by The European Union Blockchain Observatory & Forum Nov. 29, 2021 34 Pgs.

"Flexible NFT Royalty Distribution" 2022 Devpost, Inc. 4 Pgs.

Alex W. Gomezz "NFT Royalties: What Are They and How Do They Work?" 2022 Cyber Scrilla 5 Pgs.

Zach Burks, James Morgan, Blaine Malone, James S sibel "EIP-2981: NFT Royalty Standard" Ethereum Improvement Proposals, No. 2981, Sep. 2020 8 Pgs.

"NiftyPays overview Bringing flexibility to the nascent NFT ecosystem with staking and collateralization features" May 17, 2021 5 Pgs.

Andrei-Dragos Pope "Non-Fungible Tokens (NFT)—Innovation beyond the craze" Aug. 2021 6 Pgs.

\* cited by examiner

Fig. 4

The sales price for an NFT is split in percentage based on the following table:

| prior owners | 1 | 2 | 3 | 4 | 5 | 6 | 7 | 8 | 9 | 10 |
|---|---|---|---|---|---|---|---|---|---|---|
| sales price | 100 | 100 | 100 | 100 | 100 | 100 | 100 | 100 | 100 | 100 |
| seller | 80 | 80 | 80 | 80 | 80 | 80 | 80 | 80 | 80 | 80 |
| platform | 1 | 1 | 1 | 1 | 1 | 1 | 1 | 1 | 1 | 1 |
| creator | 10 | 10 | 10 | 10 | 10 | 10 | 10 | 10 | 10 | 10 |
| maven (first owner) | 1 | 1 | 1 | 1 | 1 | 1 | 1 | 1 | 1 | 1 |
| last owner | 8 | 4 | 4 | 4 | 4 | 4 | 4 | 4 | 4 | 4 |
| 2nd from | | 4 | 2 | 2 | 2 | 2 | 2 | 2 | 2 | 2 |
| 3rd from | | | 2 | 1 | 1 | 1 | 1 | 1 | 1 | 1 |
| 4th from | | | | 1 | 0.5 | 0.5 | 0.5 | 0.5 | 0.5 | 0.5 |
| 5th from | | | | | 0.5 | 0.25 | 0.25 | 0.25 | 0.25 | 0.25 |
| 6th from | | | | | | 0.25 | 0.125 | 0.125 | 0.125 | 0.125 |
| 7th from | | | | | | | 0.125 | 0.0625 | 0.0625 | 0.0625 |
| 8th from | | | | | | | | 0.0625 | 0.03125 | 0.03125 |
| 9th from | | | | | | | | | 0.03125 | 0.015625 |
| 10th from | | | | | | | | | | 0.015625 |

In the example:
- The platform/contract owner takes a fee of 1%
- The seller is paid out 80% of the sales price
- The creator is paid a 10% royalty for the trade
- The remaining 9% is split fractionally between all historical owners of the NFT based on their ancestory as owners
- Each generation of owner splits the remaining value with all older owners

… (1)

ENABLING DEEP HISTORICAL DATA USE VIA NFT RE-MINTING

RELATED APPLICATIONS

The present application claims the benefit of and priority to a Provisional Patent Application Ser. No. 63/251,984 filed on Oct. 4, 2021, and titled "Enabling Deep Historical Data Use Via NFT Re-Minting," which is hereby incorporated fully by reference into the present application.

BACKGROUND

Existing non-fungible token (NFT) blockchains hold ownership history within a blockchain transactional database, which records each transaction as it occurs, but has no way of providing comprehensive ownership history for an NFT in response to a single query. As a result, a participant in an NFT marketplace must typically utilize a third-party aggregator that has monitored and cached the history of an NFT by playing forward the transactions of the blockchain. This requires external computation and storage by a trusted third party, rather than the more desirable use of a decentralized cache of the historical ownership chain in a way that a user or service can immediately observe and verify with a single query.

One consequence of the absence of readily accessible historical ownership data is that it fails to incentivize NFT transactions. That is to say, in the existing marketplace for NFT transactions, NFT market platforms pay out a share of NFT sales transactions to the platform itself as a maintenance fee, and may pay out a share to the creator as a royalty fee. The seller of the NFT receives the remainder of sales funds and loses ownership of the NFT. The NFT is then removed from the digital wallet belonging to the seller, who receives no ongoing value for being an early adopter of the NFT. This state of affairs tends to encourage NFT owners to act as collectors and to display their owned NFTs in a gallery in order to showcase their collection, but provides no incentive, other than receipt of the sale price, for transferring ownership of an NFT to another collector. As a result, the existing NFT transaction environment tends to result undesirably in stagnating NFT collections.

BRIEF DESCRIPTION OF THE DRAWINGS

FIG. 4 shows an exemplary royalty schedule, according to one implementation;

DETAILED DESCRIPTION

Figure 1:
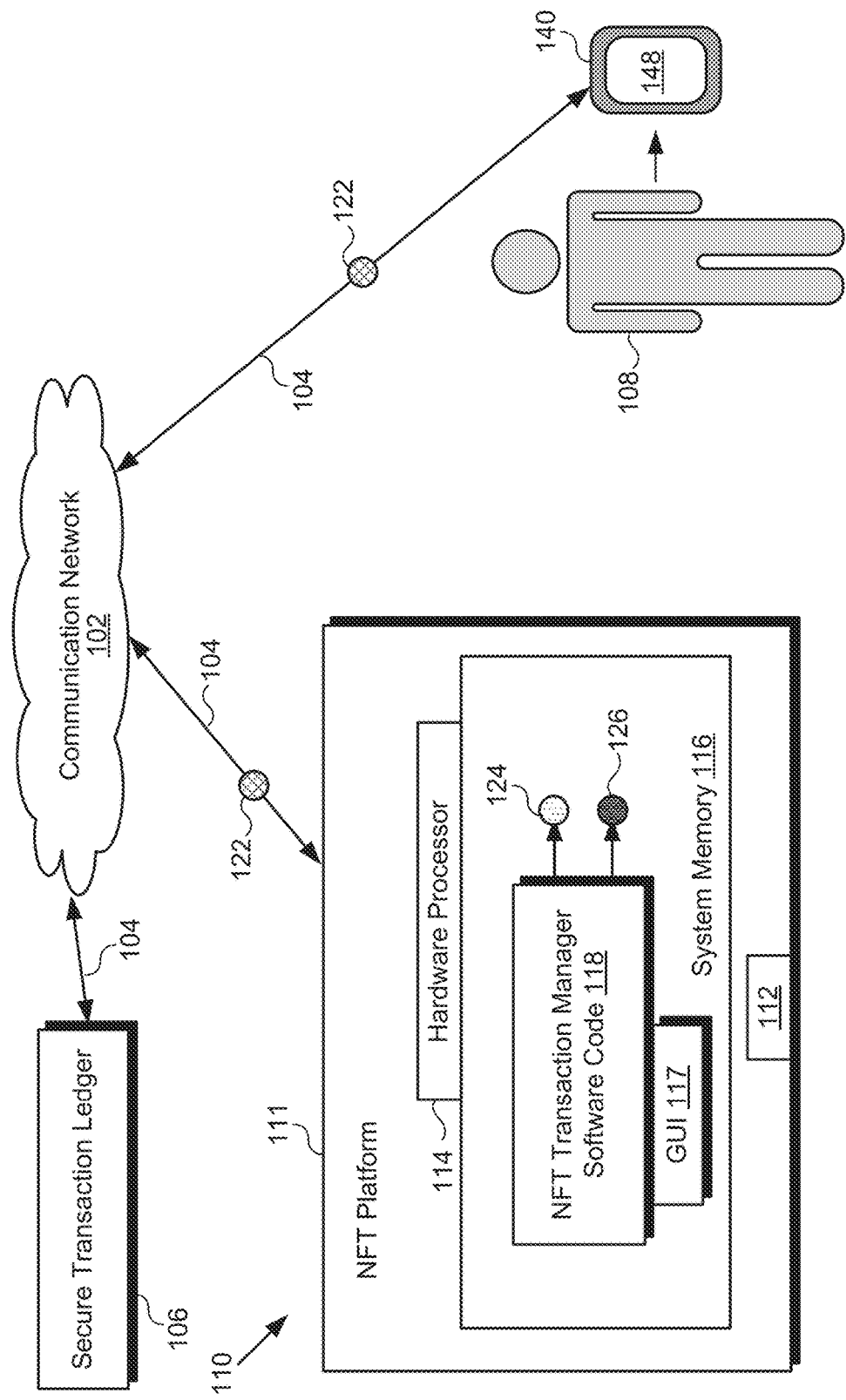
FIG. 1 shows a diagram of an exemplary system enabling deep historical data use via NFT re-minting, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The technology known as a non-fungible token (NFT) is allowing individual artists and companies to transfer ownership rights to a digital asset, such as a file containing a photo or other image, video, audio, or any other desirable digital representation of a real or virtual object. An NFT is a unit of data stored on a secure digital ledger, such as a blockchain for example, that certifies a digital asset to be unique and therefore non-fungible. An NFT can be used to represent a digital asset which is typically stored in and accessible via the cloud, and to confer ownership of that digital asset to an individual or entity. However, in contrast to traditional ownership rights, ownership of an NFT does not prevent others from accessing, or even copying, the digital asset associated with the NFT. That is to say, an NFT confers a right of ownership of a digital asset that is separate from copyright.

The present application discloses systems and methods for enabling deep historical data use via NFT re-minting that address and overcome the deficiencies in the conventional art. As noted above, existing NFT blockchains hold ownership history within a blockchain transactional database, which records each transaction as it occurs, but has no way of providing comprehensive ownership history for an NFT in response to a single query. As a result, a participant in an NFT marketplace must typically utilize a third-party aggregator that has monitored and cached the history of an NFT by playing forward the transactions of the blockchain. This requires external computation and storage by a trusted third party, rather than the more desirable use of a decentralized cache of the historical ownership chain in a way that a user or service can immediately observe and verify with a single query.

One consequence of the absence of readily accessible historical ownership data is that it fails to incentivize NFT transactions. That is to say, conventional NFT market platforms pay out a share of NFT sales transactions to the platform itself as a maintenance fee, and may pay out a share to the creator as a royalty fee. The seller of the NFT receives the remainder of sales funds and loses ownership of the NFT. The NFT is then removed from the digital wallet belonging to the seller, who receives no ongoing value for being an early adopter of the NFT. This state of affairs tends to encourage NFT owners to act as collectors and to display their owned NFTs in a gallery in order to showcase their collection, but provides no incentive, other than receipt of the sale price, for transferring ownership of an NFT to another collector. As a result, the existing NFT transaction environment tends to result undesirably in stagnating NFT collections and stagnant royalties.

The novel and inventive concepts disclosed in the present application introduce an NFT trading system in which a historical record of a particular collector's participation in a chain of ownership of an NFT is retained, rewarded, and celebrated. The present solution rewards previous ownership of a right to an NFT by distributing royalties to some or all previous owners of the right to the NFT when that right is sold or otherwise transferred by its present owner. The present solution encourages owners to discover new NFTs and NFT creators by rewarding the original acquirer of the right, i.e., first entity to which a right to a newly minted NFT is conveyed (hereinafter referred to as a "maven" or "maven owner") to an enhanced royalty. Another advantageous aspect of the present concepts is recognition of prior ownership, as well as present ownership of NFTs by providing one or more user interface (UI) or user interface/user experience (UI/UX) galleries for each category of NFT. For example, according to the present concepts, an NFT collector may have on display a UI or UI/UX gallery devoted to their previously owned NFTs and another gallery devoted to NFTs for which they are or were the maven owner, as well another gallery devoted to presently owned NFTs, another gallery devoted to presently owned NFTs that are for sale, or both. The advantages conferred to prior ownership of an NFT by the concepts disclosed in the present application serve to incentivize NFT transactions, thereby promoting and celebrating this new type of digital asset while advantageously generating more royalty revenues.

It is noted that, as defined in the present application, the term "NFT asset" may refer to any digital asset having its ownership certified by an NFT. Examples of an NFT asset may include a digital file containing an image or images, video without audio, audio without video, or audio-video (AV) content, such as all or part of a television (TV) episode, movie, or video game, to name a few. In addition, or alternatively, in some implementations, an NFT asset may be or include a digital representation of persons, fictional characters, locations, objects, and identifiers such as brands and logos, for example, which populate a virtual reality (VR), augmented reality (AR), or mixed reality (MR) environment. Such digital representations may depict virtual worlds that can be experienced by any number of users synchronously and persistently, while providing continuity of data such as personal identity, user history, entitlements, possessions, payments, and the like. Moreover, in some implementations, an NFT asset may be a hybrid of traditional audio-video and fully immersive VR/AR/MR experiences, such as interactive video.

It is further noted that the term "NFT wallet" may refer to any secure software application assigned to an owner of an NFT asset that stores the NFT credentials (e.g., public and private keys, certifying ownership of the NFT asset), and enables the NFT asset owner to transfer, i.e., sell or otherwise reassign ownership of the NFT asset to another person or entity. It is also noted that the relationship between an NFT asset and an NFT wallet is many-to-one rather than one-to-one. That is to say, in some implementations, the same NFT wallet may store NFT credentials for each of multiple NFT assets. However, the NFT credentials of an NFT asset are uniquely present in only one NFT wallet at a time.

FIG. 1 shows system 110 enabling deep historical data use via NFT re-minting, according to one exemplary implementation. As shown in FIG. 1, system 110 includes NFT platform 111 having transceiver 112, hardware processor 114, and system memory 116 implemented as a computer-readable non-transitory storage medium. According to the present exemplary implementation, system memory 116 stores NFT transaction manager software code 118 providing graphical user interface (GUI) 117. In addition, FIG. 1 shows NFT collector 108, who may act as a buyer or seller of NFTs (hereinafter "seller 108"), client device 140 utilized by seller 108 and having display 148, secure transaction ledger 106, communication network 102 and network communication links 104 communicatively coupling system 110 to client device 140 and secure transaction ledger 106. Also shown in FIG. 1 is NFT 122 transferred away from seller 108 by system 110 via communication network 102 and network communication links 104, re-minted NFT 124 corresponding to NFT 122, and newly re-minted NFT 126 also corresponding to NFT 122.

With respect to the representation of system 110 shown in FIG. 1, it is noted that although NFT transaction manager software code 118 is depicted as being stored in system memory 116 for conceptual clarity, more generally, system memory 116 may take the form of any computer-readable non-transitory storage medium. The expression "computer-readable non-transitory storage medium," as used in the present application, refers to any medium, excluding a carrier wave or other transitory signal that provides instructions to hardware processor of a computing platform, such as hardware processor 114 of NFT platform 111. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts NFT transaction manager software code 118 as being entirely located in a single instance of system memory 116, that representation is also merely provided as an aid to conceptual clarity. More generally, system 110 may include one or more computing platforms, such as computer servers for example, which may be co-located, or may form an interactively linked but distributed system, such as a cloud-based system, for instance. As a result, hardware processor 114 and system memory 116 may correspond to distributed processor and memory resources of system 110. Thus, it is to be understood that various software modules of NFT transaction manager software code 118 may be stored remotely from one another within the distributed memory resources of system 110.

Hardware processor 114 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of NFT platform 111, as well as a Control Unit (CU) for retrieving programs, such as NFT transaction manager software code 118, from system memory 116, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, NFT platform 111 may correspond to one or more web servers, accessible over a packet-switched network such as the Internet, for example. Alternatively, NFT platform 111 may correspond to one or more computer servers supporting a private wide area network (WAN), local area network (LAN), or included in another type of limited distribution or private network. However, in some implementations, system 110 may be implemented virtually, such as in a data center. For example, in some implementations, system 110 may be implemented in software, or as virtual machines. Moreover, in some implementations, communication network 102 may be a high-speed network suitable for high performance computing (HPC), for example a 10 GigE network or an Infiniband network.

Transceiver 112 of system 110 may be implemented as a wireless communication unit configured for use with one or more of a variety of wireless communication protocols. For example, transceiver 112 may be implemented as a fourth generation (4G) wireless transceiver, or as a 5G wireless transceiver. In addition, or alternatively, transceiver 112 may be configured for communications using one or more of Wireless Fidelity (Wi-Fi), Worldwide Interoperability for Microwave Access (WiMAX), Bluetooth, Bluetooth low energy, ZigBee, radio-frequency identification (RFID), near-field communication (NFC), and 60 GHz wireless communications methods.

System 110 may be a creator or "minter" of NFTs, a minter and warehouse of NFTs, or a distributor or warehouse of NFTs created by others. Secure transaction ledger 106 may take the for of a public or private secure transaction ledger. Examples of such secure transaction ledgers may include Blockchain, Hashgraph, Directed Acyclic Graph (DAG), and Holochain ledgers, to name a few. In use cases in which secure transaction ledger 106 is a blockchain ledger, it may be advantageous or desirable to implement secure transaction ledger 106 to utilize a consensus mechanism having a proof-of-stake (PoS) protocol, rather than the more energy intensive proof-of-work (PoW) protocol. Although secure transaction ledger 106 is shown to be remote from system 110 in FIG. 1, such as a cloud-based or distributed secure transaction ledger, that implementation is merely exemplary. In other implementations, secure transaction ledger 106 may be stored in system memory 116 and may be controlled by system 110.

Figure 2:
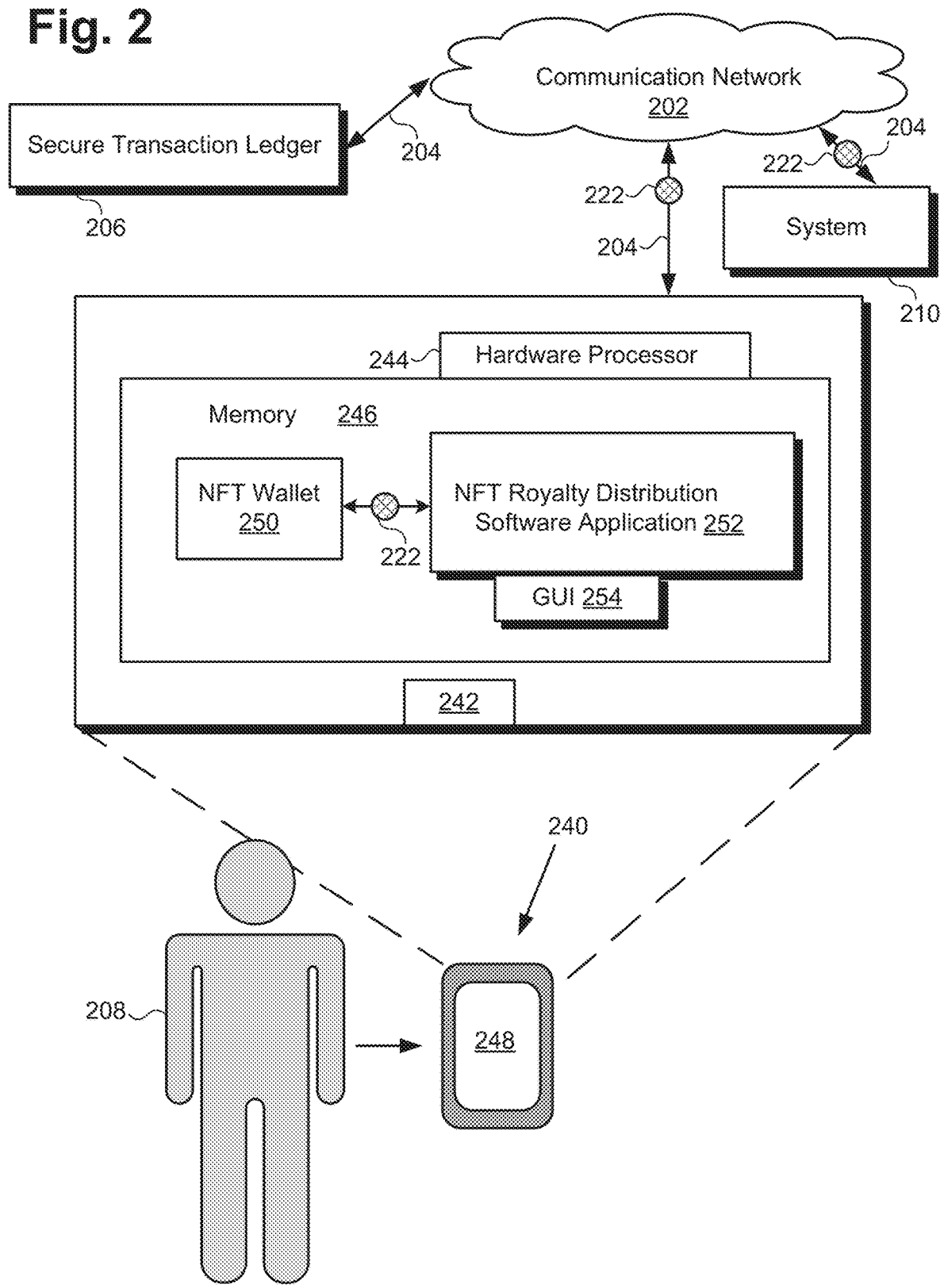
FIG. 2 shows a diagram of a client device, configured to mediate acquisition and transfer of a right to each of one or more NFTs, according to one implementation.

FIG. 2 shows client device 240 of seller 208, configured to mediate acquisition and transfer of a right to NFT 222, according to one implementation. As shown in FIG. 2, client device 240 includes transceiver 242, hardware processor 244, display 248, and memory 246 implemented as a computer-readable non-transitory storage medium storing digital wallet 250 (hereinafter "NFT wallet 250") and NFT royalty distribution software application 252 providing GUI 254. Also shown in FIG. 2 are system 210, communication network 202, network communication links 204, and secure transaction ledger 206.

Although client device 240 is shown as a smartphone in FIG. 2 that representation is provided merely as an example. More generally, client device 240 may be any suitable mobile or stationary computing device or system that implements data processing capabilities sufficient to provide GUI 254, support connections to communication network 202, and implement the functionality ascribed to client device 240 herein. For example, in other implementations, client device 240 may take the form of a desktop computer, laptop computer, tablet computer, smart TV, a smart wearable device, such as a smartwatch for example, or an AR or VR device.

Transceiver 242 may be implemented as a wireless communication unit configured for use with one or more of a variety of wireless communication protocols. For example, transceiver 242 may be implemented as a fourth generation (4G) wireless transceiver, or as a 5G wireless transceiver. In addition, or alternatively, transceiver 112 may be configured for communications using one or more of Wireless Fidelity (Wi-Fi), Worldwide Interoperability for Microwave Access (WiMAX), Bluetooth, Bluetooth low energy, ZigBee, radio-frequency identification (RFID), near-field communication (NFC), and 60 GHz wireless communications methods.

With respect to display 248 of client device 240, display 248 may be physically integrated with client device 240 or may be communicatively coupled to but physically separate from client device 240. For example, where client device 240 is implemented as a smartphone, laptop computer, or tablet computer, display 248 will typically be integrated with client device 240. By contrast, where client device 240 is implemented as a desktop computer, display 248 may take the form of a monitor separate from client device 240 in the form of a computer tower. Furthermore, display 248 of client device 240 may be implemented as a liquid crystal display (LCD), a light-emitting diode (LED) display, an organic light-emitting diode (OLED) display, a quantum dot (QD) display, or any other suitable display screen that performs a physical transformation of signals to light.

NFT royalty distribution software application 252 may be configured to initiate a secure and authorized communication session in order to receive or transmit NFT 222, enable seller 208 to acquire or sell a right to NFT 222 by providing inputs to GUI 254, or compute and issue a royalty payment to system 210, a prior owner of NFT 222, or both, in response to a transfer of the right to NFT 222 by seller 208. It is noted that, in some implementations, NFT royalty distribution software application 252 can be configured to compute and distribute royalties automatically, based on data specified in a smart contract associated with NFT 222.

According to the exemplary implementation shown in FIG. 2, NFT wallet 250 can store NFT(s) on client device 240. However, in other implementations, NFT wallet 250 may not be resident on client device 240, but may be a virtual wallet remote from client device 240, such as a cloud-based virtual wallet accessible to client device 240 via communication network 202 and network communication links 204. In yet other implementations, NFT wallet 250 may be a hardware cryptocurrency wallet, such as a Ledger Nano S® device or the like.

System 210, NFT 222, communication network 202, network communication links 204, and secure transaction ledger 206 correspond respectively in general to system 110, NFT 122, communication network 102, network communication links 104, and secure transaction ledger 106, in FIG. 1. Thus, system 210, NFT 222, communication network 202, network communication links 204, and secure transaction ledger 206 may share any of the characteristics attributed to respective system 110, NFT 122, communication network 102, network communication links 104, and secure transaction ledger 106 by the present disclosure, and vice versa.

Moreover, seller 208 and client device 240, in FIG. 2, correspond respectively in general to seller 108 and client device 140, in FIG. 1, and those corresponding features may share any of the characteristics attributed to either corresponding feature by the present disclosure. That is to say, although not shown in FIG. 1, in addition to display 148, client device 140 may include features corresponding respectively to transceiver 242, hardware processor 244, and memory 246 storing NFT wallet 250 and NFT royalty distribution software application 252 providing GUI 254.

Figure 3:
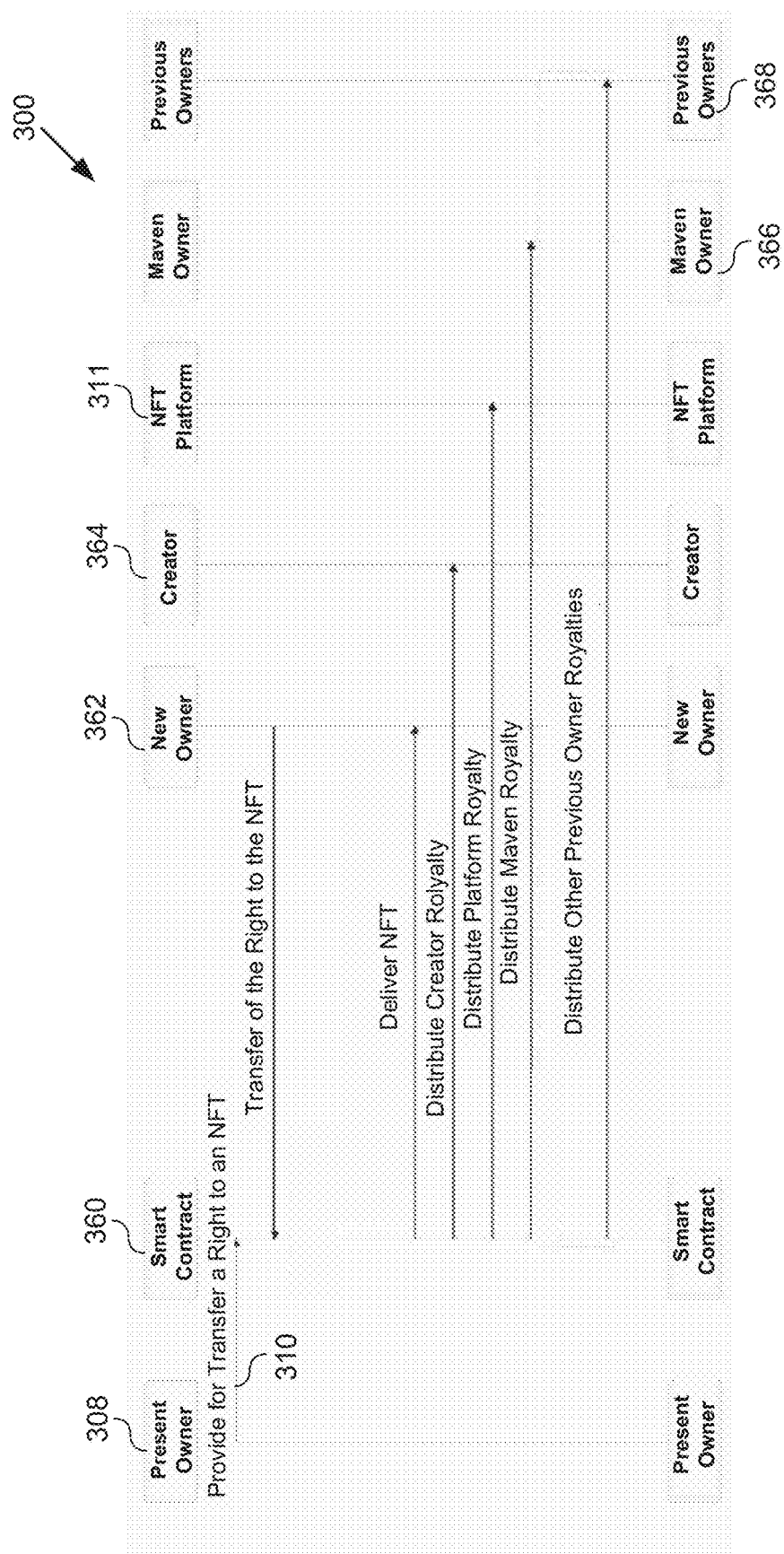
FIG. 3 shows a swimlane diagram of a transfer of a right to an NFT and subsequent distribution of royalties based on that transfer, according to one implementation.

FIG. 3 shows swimlane diagram 300 of a transfer of a right to an NFT and subsequent distribution of royalties based on that transfer, according to one implementation. Swimlane diagram 300 identifies present owner 308, NFT platform 311 smart contract 360, new owner 362 of the NFT, creator 364 of the NFT, maven owner 366 of the NFT, and one or more previous owners 368 (hereinafter "previous owner(s) 368") of the NFT. It is noted that present owner 308 and NFT platform 311 correspond respectively in general to seller 108/208 and NFT platform 111 shown variously in FIGS. 1 and 2. Thus, present owner 308 and NFT platform 311 may share any of the characteristics attributed to respective seller 108/208 and NFT platform 111 by the present disclosure, and vice versa.

According to the exemplary process outlined in FIG. 3, present owner 308 uses NFT platform 311 to provide an NFT for transfer of the right to the NFT, e.g., ownership of the NFT. This may result in generation of smart contract 360 governing the terms of the transfer, including the transfer price and royalty distribution schedule. Referring to FIG. 1 in combination with FIG. 3, it is noted that smart contract 360 may be generated by NFT transaction manager software code 118, in FIG. 1, executed by hardware processor 114 of system 110. Once the transaction has been verified and payment for the right to the NFT has been remitted, hardware processor 114 of system 110 may execute NFT transaction manager software code 118 to deliver the NFT to new owner 362, and to distribute respective portions of the sales price as royalties to each of NFT platform 111/311, creator 364, maven owner 366, and previous owner(s) 368 of the NFT.

It is further noted that, although in some use cases NFT platform 111/311 may receive the full platform royalty associated with the transfer of the right to the NFT outlined in FIG. 3, in other use cases, NFT platform 111/311 may act on behalf of or in conjunction with another platform. In those use cases, some, or all of the platform royalty may be distributed to that other platform.

The information identifying NFT platform 111/311 or another platform, as well as present owner 308, creator 364, maven owner 366, and other previous owner(s) 368 may be obtained from secure transaction ledger 106/206 in FIGS. 1 and 2. In some implementations, hardware processor 114 of system 110 may execute NFT transaction manager software code 118 to search secure transaction ledger 106 for all data necessary to determine and payout the seller portion and royalties for each of NFT platform 111/311 or another platform, as well as creator 364, maven owner 366, and other previous owner(s) 368. However, in other implementations, that seller portion and those royalties may be determined and paid out in a distributed way using client devices corresponding to client device 140/240.

For example, in some use cases, hardware processor 114 of system 110 may execute NFT transaction manager software code 118 to determine and payout the seller portion to present owner 308, as well as royalties to NFT platform 111/311 or another platform, and creator 364. However, NFT royalty distribution software application 252, when executed by hardware processor 244 of client device 140/240, may be executed to obtain the information identifying the owner of the NFT immediately previous to present owner 308, and to determine and distribute the royalty payment owed to that single previous owner. A corresponding NFT royalty distribution software application 252, when executed by hardware processor 244 of a client device of that previous owner may then determine and distribute the royalty payment owed to the previous owner once further removed from seller present owner 308, and so forth until the maven owner receives royalty payout. In such a distributed royalty determination and payout scheme, each instantiation of NFT royalty distribution software application 252 may report back to NFT transaction manager software code 118 to confirm that its respective royalty determination and payout responsibility has been fulfilled.

FIG. 4 shows exemplary royalty schedule 400, according to one implementation. It is noted that specific numerical percentages are identified in royalty schedule 400 in the interests of conceptual clarity. However, in other implementations, any other values deemed advantageous or desirable may be substituted for those shown in FIG. 4. According to the royalty distribution scheme shown by royalty schedule 400, for example, NFT platform 111/311 or another platform is paid one percent (1%) of the transfer price of a right to an NFT, present owner 308 (e.g., seller) is paid out 80% of the sales price, the creator is paid a 10% royalty for the transaction, while the remaining 9% is split fractionally between all previous owners of the right to the NFT based on their ancestry as owners. That as to say, in one implementation, each generation of owner splits the remaining value with all older owners.

It is noted that because cryptocurrencies can have arbitrary precision, the number of recipients is only limited by loop processing time in the smart contract code. It is further noted that, in various implementations, the number of owner generations receiving royalties may be capped at some predetermined integer value of most recent owners, or most recent owners plus maven owner 366, in FIG. 3, or may be limited by a time constraint, such as one year or any other predetermined time interval following minting of the NFT.

Figure 5:
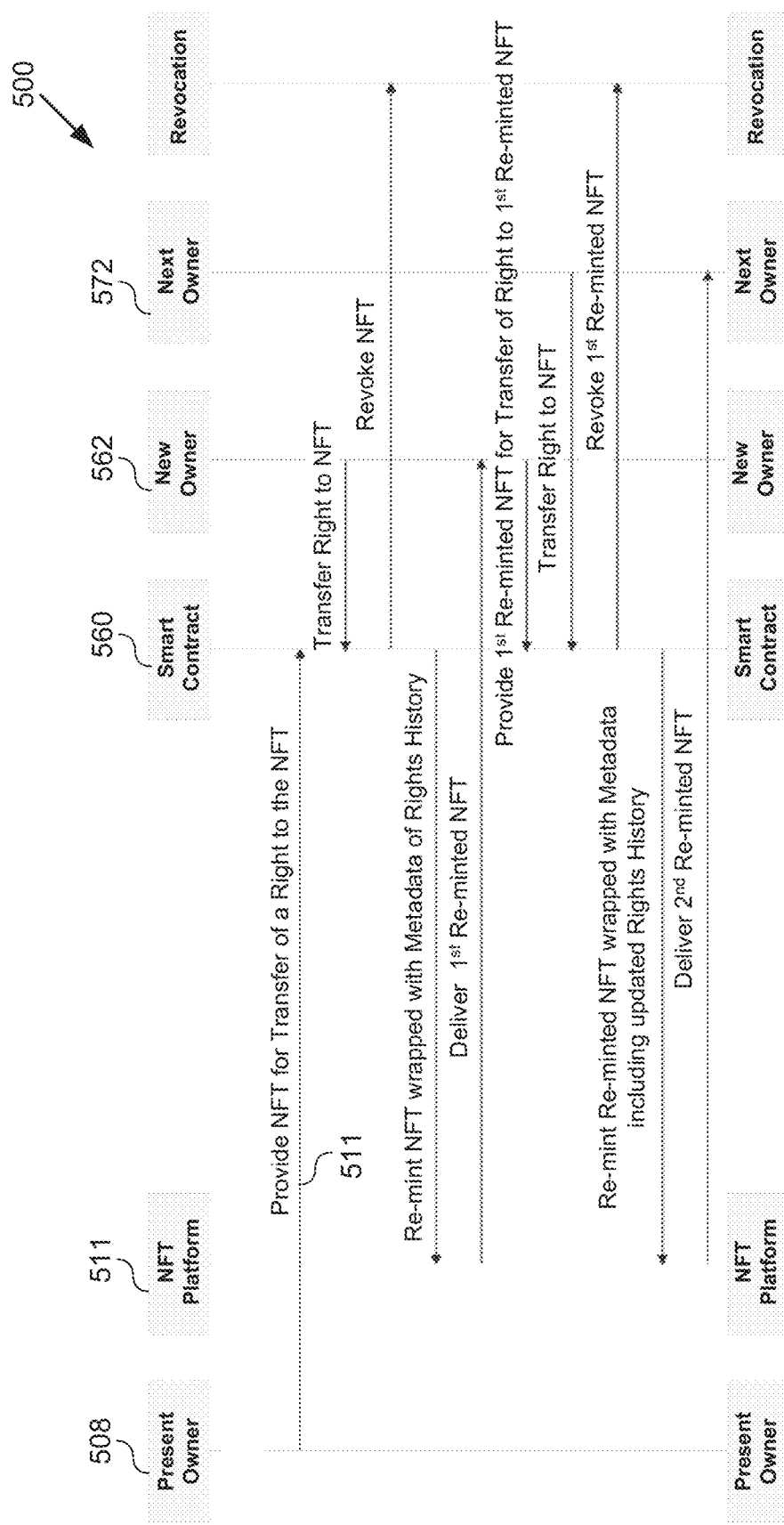
FIG. 5 shows a swimlane diagram of serial transfers of a right to an NFT, according to one implementation.

FIG. 5 shows swimlane diagram 500 of serial transfers of a right to an NFT, according to another implementation. It is noted that the distribution of a transfer price portion to each entity transferring the right to the NFT, as well as the royalties paid out to its creator, NFT platform, maven owner, and previous owners may adhere to the scheme described above by reference to FIGS. 3 and 4. Swimlane diagram 500 identifies present owner 508 of a right to an NFT, NFT platform 511, smart contract 560, new owner 562 of the right to the NFT, and next owner 572 of the right to the NFT. It is noted that present owner 508 corresponds to seller 108/208 and present owner 308 in FIGS. 1, 2, and 3, and NFT platform 511 corresponds in general to NFT platform 111/311 in FIGS. 1 and 3, while smart contract 560 and new owner 562 correspond respectively to smart contract 360 and new owner 362 in FIG. 3. Consequently, present owner 508, NFT platform 511, smart contract 560, and new owner 562 may share any of the characteristics attributed to respective seller 108/208 and present owner 308, NFT platform 111/311, smart contract 360, and new owner 362 by the present disclosure, and vice versa.

According to the exemplary process outlined in FIG. 5, present owner 508 uses NFT platform 511 to provide an NFT for transfer of the right to the NFT, e.g., ownership of the NFT, the NFT having been minted to include metadata (hereinafter "first metadata") providing a historical rights record of the NFT, the historical rights record identifying present owner 508. That action results in generation of smart contract 560 governing the transfer of the right to the NFT, and that, in some implementations, includes a royalty schedule for payment of royalties to a plurality of previous owners of the right to the NFT in response to the transfer of the right to the NFT by present owner 508. Referring to FIG. 1 in combination with FIG. 5, it is noted that smart contract 560 may be generated by NFT transaction manager software code 118, in FIG. 1, executed by hardware processor 114 of system 110.

Once the transfer of the right to the NFT to new owner 562 has been verified and payment for the transfer has been remitted, hardware processor 114 of system 110 may execute NFT transaction manager software code 118 to re-mint the NFT, deliver the re-minted NFT to new owner 572, and distribute a portion of the transfer price to a creator of the NFT while retaining a portion of the sales price as a platform royalty for NFT platform 111/511 or another platform. That is to say, although the transfer of the right to the NFT and payout of proceeds and royalties based on that transfer in the implementation shown in FIG. 5 proceed substantially like those occurring in the implementation shown in FIG. 3, according to the exemplary implementation shown in FIG. 5, when the right to the NFT is transferred to new owner 572, hardware processor 114 of system 110 may execute NFT transaction manager software code 118 to re-mint the NFT to include additional metadata (hereinafter "second metadata") relating to the transfer data in the historical rights record of the NFT and identifying new owner 562 of the right to the NFT, to deliver the re-minted NFT to new owner 562, to revoke or "burn" the previous version of the NFT, and to distribute respective portions of the transfer price as royalties to NFT platform 111/511 and previous owners of the right to the NFT. Although in some use cases NFT platform 111/511 may receive the full platform royalty associated with the transfer of the right to the NFT outlined in FIG. 5, in other use cases, NFT platform 111/511 may act on behalf of or in conjunction with another platform. In those use cases, some, or all of the platform royalty may be distributed to that other platform.

Moreover, according to the exemplary implementation shown in FIG. 5, when the right to the NFT is subsequently transferred to next owner 572, that transaction has been verified, and payment for the right to the NFT by next owner 572 has been remitted, hardware processor 114 of system 110 may execute NFT transaction manager software code 118 to newly re-mint the NFT to include yet more metadata relating to the transfer data in the historical rights record of the NFT and identifying next owner 572 of the right to the NFT, to deliver the newly re-minted NFT to next owner 572, to revoke or "burn" the previous re-minted NFT, and to distribute respective portions of the transfer price as royalties to NFT platform 111/511 and previous owners of the right to the NFT.

Thus, according to the implementation shown in FIG. 5, and by further reference to FIG. 1, hardware processor 114 of system 110 may execute NFT transaction manager software code 118 to effectively perform re-minting operations in which it replaces an existing NFT with a new NFT that is wrapped or signed with the historical data. It is noted that, as used in the present application, the terms "wrapped" and "wrapping" refer to the storing of historical rights data for an NFT with the NFT itself. Thus, the re-minting operation results in a re-minted NFT including layered metadata that identifies the originally minted NFT, a wrapping for the maven owner of the right to the NFT, and wrappings for all other previous owners of that right, as well as a wrapping for present owner 508, new owner 562, and next owner 572, as the right to the NFT undergoes serial transfer. Consequently, the information identifying NFT platform 111/511 or another platform, as well as the creator of the NFT, the maven owner of the right to the NFT, and all other owner(s) of the right to the NFT is carried by the re-minted NFT itself rather than having to be obtained from secure transaction ledger 106/206 in FIGS. 1 and 2. Because searching secure transaction ledger 106/206 in FIGS. 1 and 2 for historical rights data is typically a time consuming and computationally expensive process, storing such historical rights data with the NFT itself in a re-minting process advantageously increases the speed with which transfers of rights may be completed, while significantly reducing computational overhead.

As discussed above, an additional advantageous aspect of the present concepts is recognition of prior ownership, as well as present ownership of a right to an NFTs, by providing one or more UI or UI/UX galleries for each category of NFT. For example, GUI 117 of system 110/210, or GUI 254 of client device 140/240 may be used by seller 108/208 to display a UI or UI/UX gallery devoted to their previously owned NFTs and another gallery devoted to NFTs for which they are or were the maven owner of the right, as well another gallery devoted to presently owned NFTs, another gallery devoted to presently owned NFTs that are available to transfer to a new owner, or both.

It is further noted that, in addition to, or as an alternative to the implementations described above, in some use cases, the present concepts can be adapted to incentivize collaborative creation of NFT assets in addition to incentivizing NFT transactions. For example, in some implementations, ownership of the right to NFT 122 may authorize modification of the NFT asset by the owner of the right to NFT 122. In those implementations, NFT transaction manager software code 118, when executed by hardware processor 114 of system 110, or NFT royalty distribution software application 252, when executed by hardware processor 244 of client device 140/240, may be configured to determine the change in value of the NFT asset by the modification performed by the owner, and to weight future royalty distribution to that owner based at least in part on their estimated contributions to the sales price of each downstream sale of the right to NFT 122.

Figure 6A:
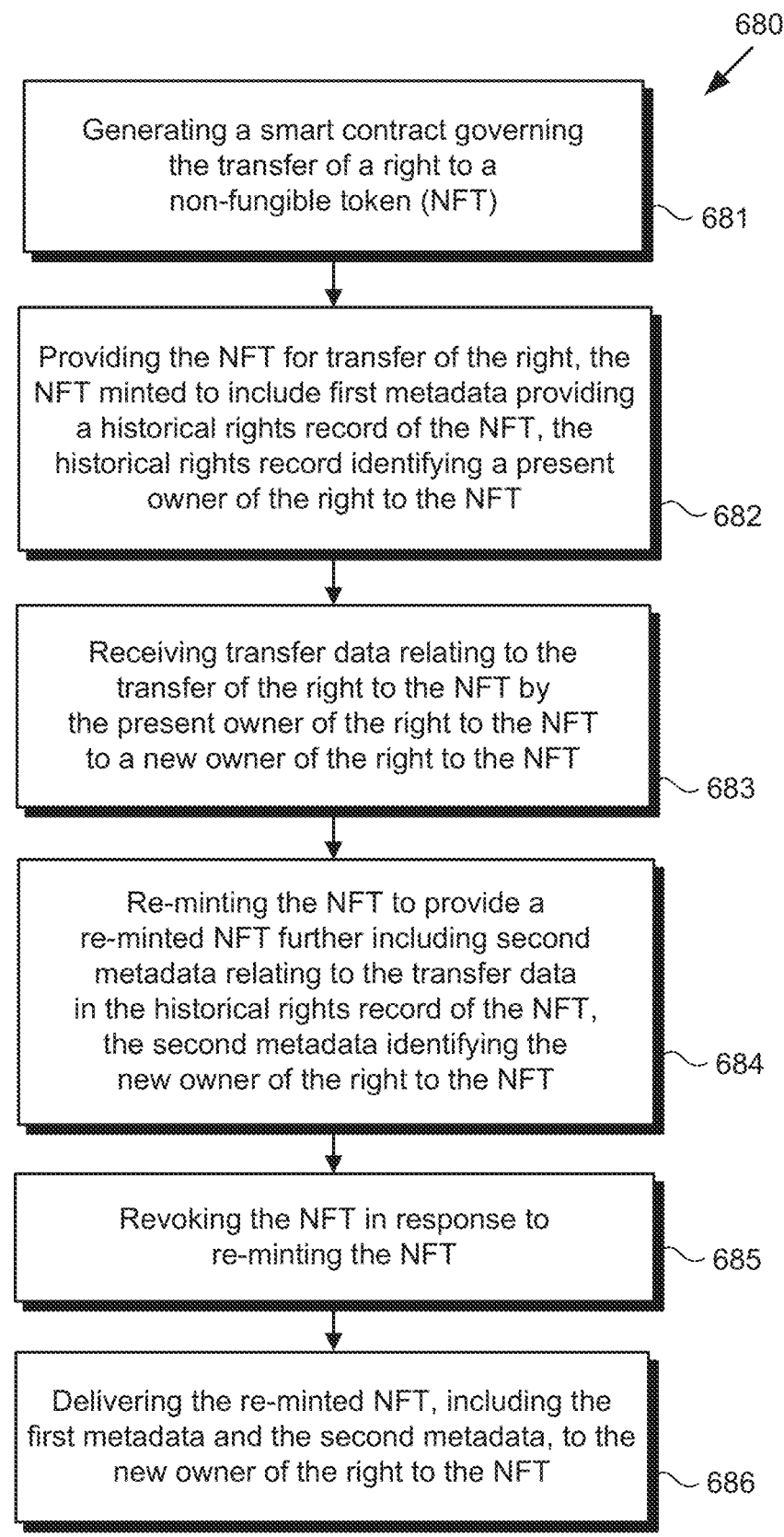
FIG. 6A shows a flowchart presenting an exemplary method for enabling deep historical data use via NFT re-minting, according to one implementation.
Figure 6B:
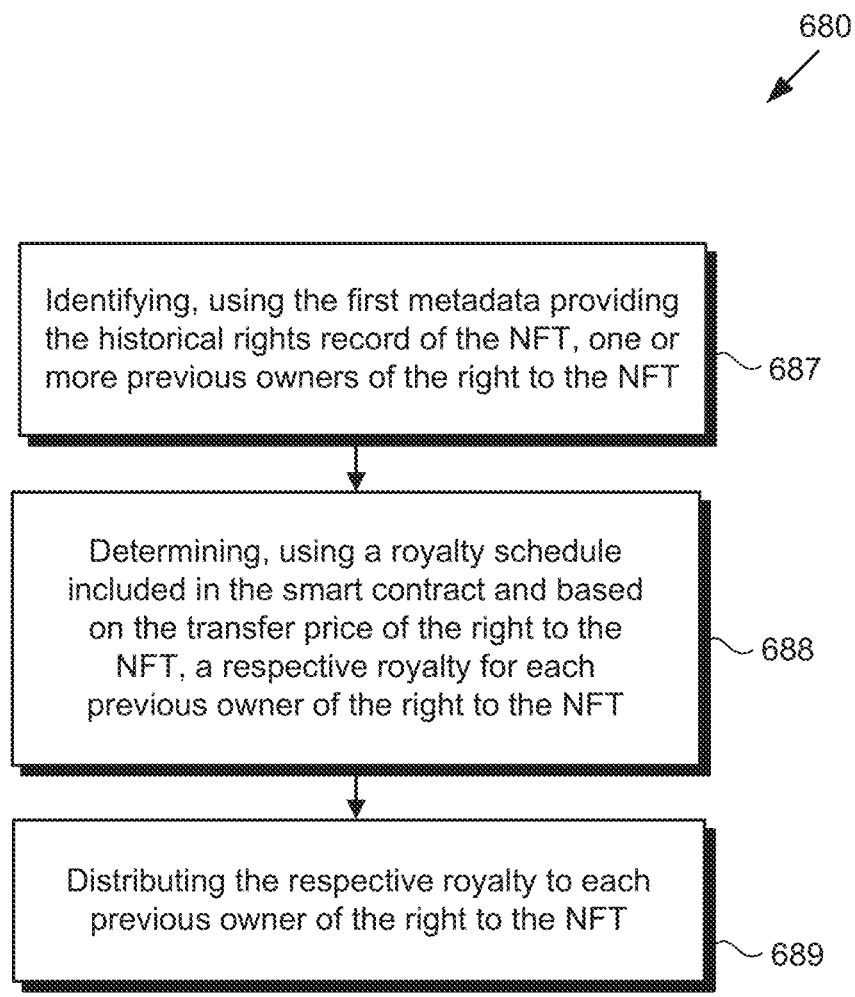
FIG. 6B shows a flowchart presenting additional exemplary actions for extending the method presented in FIG. 6A, according to one implementations.
Figure 6C:
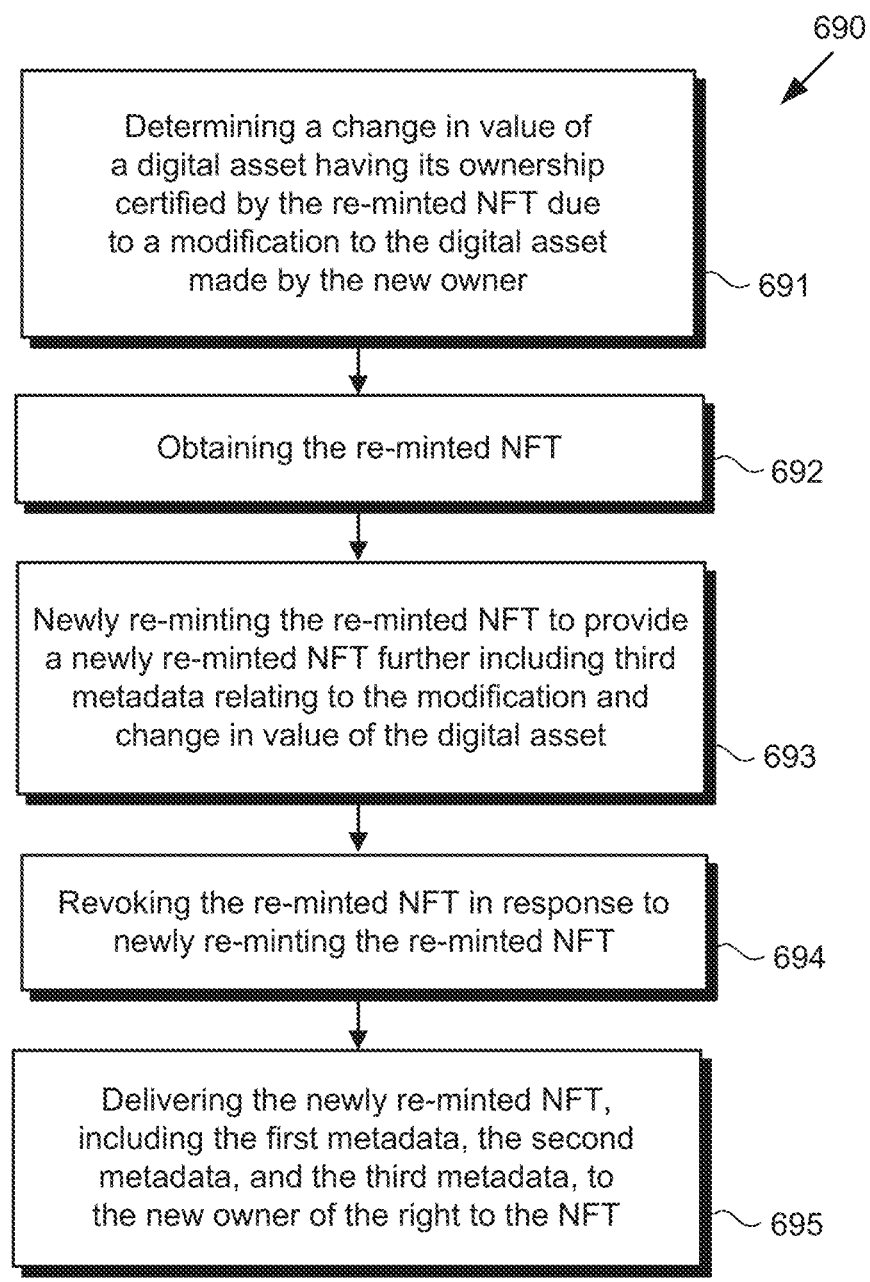
FIG. 6C shows a flowchart presenting exemplary further actions for extending the method presented in FIG. 6A, or the method presented in FIG. 6A and extended by the actions presented in FIG. 6B, according to one implementation.

The functionality of system 110, in FIG. 1, will be further described below with reference to FIGS. 6A, 6B, and 6C. FIG. 6A shows flowchart 680 presenting an exemplary method for enabling deep historical data use via NFT re-minting, according to one implementation. FIG. 6B shows additional exemplary actions for extending the method of flowchart 680, according to one implementation. FIG. 6C shows flowchart 690 presenting exemplary further actions for extending the method presented in FIG. 6A, or the method presented in FIG. 6A and extended by the actions presented in FIG. 6B, according to one implementation. With respect to the methods outlined by FIGS. 6A, 6B, and 6C, it is noted that certain details and features have been left out of flowcharts 680 and 690 in order not to obscure the discussion of the inventive features in the present application.

Referring to FIG. 6A with further reference to FIGS. 1 and 5, flowchart 680 may include generating smart contract 560 governing the transfer of a right to NFT 122 (action 681). It is noted that action 681 is optional, in some implementations of the method outlined by flowchart 680, and may be omitted from that method. In those implementations, the method outlined by flowchart 680 may begin with action 682 described below. However, and with further reference to FIG. 4, in some implementations in which the method outlined by flowchart 680 includes action 681, smart contract 560 governing the transfer of the right to NFT 122 may further include royalty schedule 400 for payment of royalties to a plurality of previous owners of the right to NFT 122 in response to the transfer of the right to NFT 122 by present owner 108/508. It is noted that, in some use cases, a creator of NFT 122 may not have been an owner of NFT 122. Thus, in some implementations, royalty schedule 400 may further include determining a royalty for such a non-owner creator of NFT 122. In implementations in which the method outlined by flowchart 680 includes action 681, action 681 may be performed by NFT transaction manager software code 118, executed by hardware processor 114 of system 110.

Continuing to refer to FIG. 6A in combination with FIGS. 1 and 5, flowchart 680 includes providing NFT 122 for the transfer of the right to NFT 122, NFT 122 having been minted to include first metadata providing a historical rights record of NFT 122, the historical rights record identifying present owner 108/508 of the right to the NFT (action 682). Action 682 may be performed by NFT transaction manager software code 118, executed by hardware processor 114 of system 110, as discussed above by reference to FIG. 5. By way of example, in some implementations, system 110 may provide NFT 122 for the transfer of the right to NFT 122, in action 681, by serving as an NFT marketplace for sale of NFT 122 by present owner 108/508. In those implementations, NFT 122 may be provided for the transfer of the right to NFT 122 by being listed for sale by system 110.

Continuing to refer to FIG. 6A in combination with FIGS. 1 and 5, flowchart 680 further includes receiving transfer data relating to the transfer of the right to NFT 122 by present owner 508 of the right to NFT 122 to new owner 562 of the right to NFT 122 (action 683). The transfer data received in action 683 may include verification of the transfer of the right to NFT 122 from present owner 508 to new owner 562, as well as the transfer price and verification that the transfer price has beery remitted by new owner 562. By way of example, the transfer data received in action 683 may be received by system 110 from one or both of present owner 508 or new owner 562 via communication network 102 and network communication links 104. That transaction data could then be verified by reference to secure transaction ledger 106. Action 683 may be performed by NFT transaction manager software code 118, executed by hardware processor 114 of system 110.

Continuing to refer to FIG. 6A in combination with FIGS. 1 and 5, flowchart 680 further includes re-minting NFT 122 to provide reminted NFT 124 further including second metadata relating to the transfer data in the historical rights record of the NFT, the second metadata identifying new owner 562 of the right to NFT 122 (action 684). That is to say, reminted NFT 124 includes the first metadata included in NFT 122 and the newly added second metadata, which together provide an aggregate historical rights record. Action 684 may be performed by NFT transaction manager software code 118, executed by hardware processor 114 of system 110, as discussed above by reference to FIG. 5.

Continuing to refer to FIG. 6A in combination with FIGS. 1 and 5, flowchart 680 further includes revoking or "burning" NFT 122 in response to re-minting NFT 122 to provide reminted NFT 124 (action 685). Action 685 may be performed by NFT transaction manager software code 118, executed by hardware processor 114 of system 110, as discussed above by reference to FIG. 5.

Continuing to refer to FIG. 6A in combination with FIGS. 1 and 5, flowchart 680 further includes delivering re-minted NFT 124, including the first metadata and the second metadata, to new owner 562 of the right to re-minted NFT 124 (action 686). Action 686 may be performed by NFT transaction manager software code 118, executed by hardware processor 114 of system 110, via communication network 102 and network communication links 104. It is noted that although flowchart 680 lists action 685 as preceding action 686, that representation is merely exemplary. In various implementations, action 685 may precede action 686, may follow action 686, or may be performed in parallel with, i.e., contemporaneously with, action 686.

As noted above by reference to action 681, in some implementations smart contract 560 may include royalty schedule 400 for payment of royalties to a plurality of previous owners of the right to NFT 122 in response to the transfer of the right to NFT 122 by present owner 562. Referring to FIG. 6B in combination with FIGS. 1 and 5, in those implementations, flowchart 680 further includes identifying, using the first metadata providing the historical rights record of NFT 122, one or more previous owners of the right to NFT 122 (action 687). Action 687 may be performed by NFT transaction manager software code 118, executed by hardware processor 114 of system 110, as discussed above by reference to FIG. 5.

Continuing to refer to FIG. 6B in combination with FIGS. 1 and 5, in some implementations, flowchart 680 further includes determining, using royalty schedule 400 and based on the transfer price of the right to NFT 122, a respective royalty for each of the one or more previous owners of the right to NFT 122 (action 688). As noted above by reference to action 681, in some use cases, a creator of NFT 122 may not have been an owner of NFT 122. In some of those use cases, action 688 may further include determining, using royalty schedule 400 and based on the transfer price of the right tot NFT 122, a royalty for such a non-owner creator of NFT 122. Action 688 may be performed by NFT transaction manager software code 118, executed by hardware processor 114 of system 110, as discussed above by reference to FIGS. 3, 4, and 5.

Continuing to refer to FIG. 6B in combination with FIGS. 1 and 5, in some implementations, flowchart 680 may optionally include distributing the respective royalty determined in action 688 to each of the one or more previous owners of the right to NFT 122 (action 689). Action 689 may be performed by NFT transaction manager software code 118, executed by hardware processor 114 of system 110, as discussed above by reference to FIGS. 3, 4, and 5.

FIG. 6C shows flowchart 690 presenting exemplary further actions for extending the method presented in FIG. 6A, or the method presented in FIG. 6A and extended by the actions presented in FIG. 6B, according to one implementation. As noted above, in some implementations, ownership of the right to NFT 122 may authorize modification of the NFT asset by the owner of the right to NFT 122. Referring to FIG. 6C in combination with FIG. 1, in some implementations, the method presented in FIG. 6A, or the method presented in FIG. 6A and extended by the actions presented in FIG. 6B, may further include determining a change in value of a digital asset having its ownership certified by re-minted NFT 124 due to a modification of the digital asset by new owner 562 (action 691). Action 691 may be performed by NFT transaction manager software code 118, executed by hardware processor 114 of system 110.

Continuing to refer to FIG. 6C in combination with FIG. 1, flowchart 690 further includes obtaining, by system 110, re-minted NFT 124 from new owner 562 (action 692). By way of example, re-minted NFT 124 may be obtained from an NFT wallet of new owner 562, by NFT transaction manager software code 118, executed by hardware processor 114 of system 110, and may be transferred to NFT platform 111 via communication network 102 and network communication links 104.

Continuing to refer to FIG. 6C in combination with FIG. 1, flowchart 690 further includes newly re-minting re-minted NFT 124 to provide newly re-minted NFT 126 further including third metadata relating to the modification and change in value of the digital asset (action 693). That is to say, newly reminted NFT 126 includes the first metadata included in NFT 122, the second metadata further included in re-minted NFT 124, and the newly added third metadata, which together provide an aggregate historical rights record of newly re-minted NFT 126. Action 693 may be performed by NFT transaction manager software code 118, executed by hardware processor 114 of system 110, as discussed above by reference to FIG. 5.

Continuing to refer to FIG. 6C in combination with FIG. 1, flowchart 690 further includes revoking re-minted NFT 124 in response to newly re-minting re-minted NFT 124 to provide newly re-minted NFT 126 (action 694). Action 694 may be performed by NFT transaction manager software code 118, executed by hardware processor 114 of system 110, as discussed above by reference to FIG. 5.

Continuing to refer to FIG. 6C in combination with FIG. 1, flowchart 690 further includes delivering newly re-minted NFT 126, including the first metadata, the second metadata, and the third metadata, to the new owner of the right to the NFT (action 695). Action 695 may be performed by NFT transaction manager software code 118, executed by hardware processor 114 of system 110, via communication network 102 and network communication links 104. It is noted that although flowchart 690 lists action 694 as preceding action 695, that representation is merely exemplary. In various implementations, action 694 may precede action 695, may follow action 695, or may be performed in parallel with, i.e., contemporaneously with, action 695.

With respect to the actions described by flowcharts 680 and 690, it is noted that in some implementations, those actions may be performed by system 110 as an automated process. It is further noted that, as defined in the present application, the term "automated," refers to systems and processes that do not require the participation of a human user, such as a human system administrator. For example, although in some implementations a human system administrator may review the performance of the systems and methods disclosed herein, and, in some cases may adjust their performance over time, that human involvement is optional. Thus, in some implementations, the processes described by flowcharts 680 and 690 may be performed under the control of hardware processing components of system 110.

Thus, the present application discloses systems and methods for enabling deep historical data use via NFT re-minting that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
  a hardware processor and a system memory storing a software code;
  the hardware processor configured to execute the software code to:
    mint a non-fungible token (NFT) certifying a digital asset to provide the NFT wrapped with first metadata providing a historical rights record of the NFT, the historical rights record identifying a present owner of a right to the NFT and one or more previous owners, if any, of the right;
    receive transfer data relating to a transfer of the right by the present owner to a new owner;
    re-mint the NFT to provide a first re-minted NFT further wrapped with second metadata relating to the transfer data in the historical rights record of the NFT, the second metadata identifying the new owner of the right;
    deliver the first re-minted NFT that is wrapped with the first metadata and the second metadata to the new owner;
    determine a change in value of the digital asset due to a modification made to the digital asset;
    re-mint the first re-minted NFT to provide a second re-minted NFT further wrapped with third metadata relating to the modification and change in value of the digital asset; and
    deliver the second re-minted NFT that is wrapped with the first metadata, the second metadata, and the third metadata, to the new owner.

2. The system of claim 1, wherein the hardware processor is further configured to execute the software code to:
  revoke the NFT in response to re-minting the NFT to provide the first re-minted NFT.

3. The system of claim 1, wherein the transfer of the right to the NFT is governed by a smart contract.

4. The system of claim 3, wherein the hardware processor is further configured to execute the software code to:
  generate the smart contract before providing the NFT for the transfer of the right to the NFT.

5. The system of claim 3, wherein the smart contract includes a royalty schedule for payment of royalties to the one or more previous owners of the right to the NFT in response to the transfer of the right to the NFT by the present owner.

6. The system of claim 5, wherein the hardware processor is further configured to execute the software code to:
  identify, using the first metadata providing the historical rights record of the NFT, the one or more previous owners of the right to the NFT;
  determine, using the royalty schedule and based on a transfer price of the right to the NFT, a respective royalty for each of the one or more previous owners of the right to the NFT; and
  distribute the respective royalty to each of the one or more previous owners of the right to the NFT.

7. A method for use by a system including a hardware processor and a system memory storing a software code, the method comprising:
  minting, by the software code executed by the hardware processor, a non-fungible token (NFT) certifying a digital asset to provide the NFT wrapped with first metadata providing a historical rights record of the NFT, the historical rights record identifying a present owner of a right to the NFT and one or more previous owners, if any, of the right;

receiving, by the software code executed by the hardware processor, transfer data relating to a transfer of the right by the present owner to a new owner;

re-minting the NFT, by the software code executed by the hardware processor, to provide a first re-minted NFT further wrapped with second metadata relating to the transfer data in the historical rights record of the NFT, the second metadata identifying the new owner of the right;

delivering, by the software code executed by the hardware processor, the first re-minted NFT that is wrapped with the first metadata and the second metadata to the new owner;

determining, by the software code executed by the hardware processor, a change in value of the digital asset due to a modification made to the digital asset;

re-minting, by the software code executed by the hardware processor, the first re-minted NFT to provide a second re-minted NFT further wrapped with third metadata relating to the modification and change in value of the digital asset; and delivering, by the software code executed by the hardware processor, the second re-minted NFT that is wrapped with the first metadata, the second metadata, and the third metadata, to the new owner.

8. The method of claim 7, further comprising:
revoking the NFT, by the software code executed by the hardware processor, in response to re-minting the NFT to provide the first re-minted NFT.

9. The method of claim 7, wherein the transfer of the right to the NFT is governed by a smart contract.

10. The method of claim 9, further comprising:
generating, by the software code executed by the hardware processor, before providing the NFT for the transfer of the right to the NFT, the smart contract.

11. The method of claim 9, wherein the smart contract includes a royalty schedule for payment of royalties to the one or more previous owners of the NFT in response to the transfer of the right to the NFT by the present owner.

12. The method of claim 11, further comprising:
identifying, by the software code executed by the hardware processor and using the first metadata providing the historical rights record of the NFT, the one or more previous owners of the right to the NFT;

determining, by the software code executed by the hardware processor and using the royalty schedule and based on a transfer price of the right to the NFT, a respective royalty for each of the one or more previous owners of the right to the NFT; and distributing, by the software code executed by the hardware processor, the respective royalty to each of the one or more previous owners of the right to the NFT.

13. A computer-readable non-transitory storage medium having stored thereon a software code, which when executed by a hardware processor, instantiates a method comprising:

minting a non-fungible token (NFT) certifying a digital asset to provide the NFT wrapped with first metadata providing a historical rights record of the NFT, the historical rights record identifying a present owner of a right to the NFT and one or more previous owners, if any, of the right;

receiving transfer data relating to a transfer of the right by the present owner to a new owner;

re-minting the NFT to provide a first re-minted NFT further wrapped with second metadata relating to the transfer data in the historical rights record of the NFT, the second metadata identifying the new owner of the right;

delivering the first re-minted NFT that is wrapped with the first metadata and the second metadata to the new owner;

determining a change in value of the digital asset due to a modification made to the digital asset;

re-minting the first re-minted NFT to provide a second re-minted NFT further wrapped with third metadata relating to the modification and change in value of the digital asset; and delivering the second re-minted NFT that is wrapped with the first metadata, the second metadata, and the third metadata, to the new owner.

14. The computer-readable non-transitory storage medium of claim 13, the method further comprising:
revoking the NFT in response to re-minting the NFT to provide the first re-minted NFT.

15. The computer-readable non-transitory storage medium of claim 13, wherein the transfer of the right to the NFT is governed by a smart contract, the method further comprising:
generating, before providing the NFT for the transfer of the right to the NFT, the smart contract.

16. The computer-readable non-transitory storage medium of claim 15, wherein the smart contract includes a royalty schedule for payment of royalties to the one or more previous owners of the NFT in response to the transfer of the right to the NFT by the present owner.

17. The computer-readable non-transitory storage medium of claim 16, the method further comprising:
identifying, using the first metadata providing the historical rights record of the NFT, the one or more previous owners of the right to the NFT;

determining, using the royalty schedule and based on a transfer price of the right to the NFT, a respective royalty for each of the one or more previous owners of the right to the NFT; and distributing the respective royalty to each of the one or more previous owners of the right to the NFT.

\* \* \* \* \*